United States Patent [19]

Kubo et al.

[11] Patent Number: 4,586,811
[45] Date of Patent: May 6, 1986

[54] CONFIDENTIAL DOCUMENT REPRODUCTION PREVENTION METHOD

[75] Inventors: Keishi Kubo; Takaaki Miyashita; Akiyoshi Yasumori, all of Yokohama, Japan

[73] Assignee: Ricoh Company, Ltd., Tokyo, Japan

[21] Appl. No.: 484,815

[22] Filed: Apr. 14, 1983

[30] Foreign Application Priority Data

Apr. 23, 1982 [JP] Japan .................. 57-068394

[51] Int. Cl.⁴ .................................... G03G 15/00
[52] U.S. Cl. ........................ 355/14 R; 355/3 R; 355/77; 355/133
[58] Field of Search ............... 355/133, 3 R, 67, 68, 355/77, 14 R, 14 E

[56] References Cited

U.S. PATENT DOCUMENTS

| | | | |
|---|---|---|---|
| 3,713,861 | 1/1973 | Sharp | 355/133 X |
| 3,852,088 | 12/1974 | Godlewski et al. | 355/133 X |
| 3,887,742 | 6/1975 | Reinnagel | 355/133 X |
| 3,977,785 | 8/1976 | Harris | 355/133 |
| 4,025,673 | 5/1977 | Reinnagel | 355/133 X |
| 4,118,122 | 10/1978 | Rees et al. | 355/77 |
| 4,281,921 | 8/1981 | Van Auken | 355/77 |
| 4,456,373 | 6/1984 | Best | 355/133 |

FOREIGN PATENT DOCUMENTS

| | | | |
|---|---|---|---|
| 0036731 | 3/1979 | Japan | 355/133 |
| 0036873 | 3/1980 | Japan | 355/133 |
| 0038513 | 3/1980 | Japan | 355/133 |
| 0096973 | 7/1980 | Japan | 355/133 |

OTHER PUBLICATIONS

IBM Tech. Disc. Bull., "No-Copy Attachment for Copier", vol. 17, No. 11, Apr. 1975, p. 3434.
IBM Tech. Disc. Bull., "Unauthorized Copy Prevention", vol. 15, No. 12, May 1973, p. 3642.
IBM Tech. Disc. Bull., "Copier System for Confidential Papers", vol. 15, No. 7, Dec. '72, p. 2328.
IBM Tech. Disc. Bull., vol. 18, No. 4, p. 1002, "Secure Document Feature for Copy Machines", Sep. '75.
IBM Tech. Disc. Bull., "Secure Document Feature for Copy Machines", vol. 15, No. 9, Feb. '73, p. 2736.
IBM Tech. Disc. Bull. "Copier Security System", vol. 18, No. 6, Nov. '75, p. 1747.
IBM Tech. Disc. Bull., "Gradiometer Document Detector for Copy Security", vol. 16, No. 6, Nov. '73, p. 1951.
IBM Tech. Disc. Bull., "Unauthorized Copy Prevention", vol. 18, No. 1, Jun. '75, p. 59.
IBM Tech. Disc. Bull., "Secure Document Feature for Copy Machines", vol. 18, No. 4, Sep. '75, p. 10.
IBM Tech. Disc. Bull., "Copier Incorporating Document Detection System", vol. 15, No. 7, Dec. '72, p. 2231.
IBM Tech. Disc. Bull., "Secure Document Feature for Copy Machines", vol. 17, No. 11, Apr. '75, p. 3198.
IBM Tech. Disc. Bull., vol. 17, No. 11, Apr. '75, p. 3182, "Copier Document Security".
IBM Tech. Disc. Bull., vol. 15, No. 2, Jul. '72, p. 453, "Secure Document Feature for Copy Machines".
IBM Tech. Disc. Bull., "Document Copy Prevention", vol. 18, No. 6, Nov. '75, p. 1717.
IBM Tech. Disc. Bull., vol. 18, No. 3, Aug. '75, "Copier Security System", p. 912.
IBM Tech. Disc. Bull., "Preventing Copying of Classified Information", vol. 19, No. 4, Sep. '76, p. 1469.
IBM Tech. Disc. Bull., "Document Security", vol. 20, No. 1, Jun. '77, p. 20.
IBM Tech. Disc. Bull., "Document Copying Inhibitor Method", vol. 17, No. 12, May '75, p. 3786.
IBM Tech. Disc. Bull., vol. 26, No. 5, Oct. '83, p. 2319, "Anti-Copy Paper".
IBM Tech. Disc. Bull., "Document Security for Copiers", vol. 19, No. 9, Feb. '77, p. 3293.

Primary Examiner—R. L. Moses
Attorney, Agent, or Firm—Flynn, Thiel, Boutell & Tanis

[57] ABSTRACT

A confidential document reproduction prevention method of preventing confidential documents from being reproduced. This method is carried out by applying a particular material as a confidential mark at least to one portion of the surface of a confidential document, which material, when exposed to illumination light, is capable of emitting light with a wavelength different from the wavelength of the illumination light; detecting the light emitted from the material by a detector in a reproduction machine when the document is exposed to the illumination light; and making the reproduction machine inoperative, upon detection of the light emitted from the material.

9 Claims, 20 Drawing Figures

CONFIDENTIAL DOCUMENT REPRODUCTION PREVENTION METHOD

BACKGROUND OF THE INVENTION

The present invention relates to a confidential document reproduction prevention method.

Recently, in many fields, it is demanded that a huge quantity of information be quickly exchanged between a number of people and transmitted to them. For that purpose, copying machines for copying documents, such as electrophotographic copying apparatus, and information transmission and recording apparatus, such as facsimile apparatus, are developed and widely used. At present, there are substantially no difficulties in making copies from ordinary documents. Further, in accordance with the remarkable development of such copying machines and information transmission and recording apparatus, the quantity of information transmitted is increasing rapidly. On the other hand, the remarkable development of copying machines and facsimile apparatus has brought about a new problem that confidential documents, for instance, new product planning documents, market research documents, diplomatic confidential materials or military confidential materials, are secretly copied without difficulty and those copies are stolen.

Under such circumstances, several methods of preventing reproduction of confidential documents by a conventional electrophotographic copying machine have been proposed.

In one method, confidential documents are prepared by writing or printing confidential image information with a fluorescent material. In this method, even if it is tried to make copies from the documents by a conventional electrophotographic copying machine, when the documents are exposed to light during the exposure process, the image areas emit light because of the presence of the fluorescent material in the image areas, while the non-image areas normally reflect light therefrom. As a result, the image areas and non-image areas cannot be optically distinguished from each other, and normal latent electrostatic images corresponding to the confidential original images cannot be formed on the surface of a photoconductor of the electrophotographic copying machine. The result is similar to that of the case where a copy is made from a blank sheet which bears no images.

In another method which utilizes substantially the same principle as in the above-described method, the entire original-image-bearing surface of the confidential document is coated with a fluorescent material. When the document is exposed to light for formation of the latent electrostatic images corresponding to the original images, light is emitted from the entire surface of the document coated with a fluorescent material. As a result, the original images become substantially invisible during the exposure process.

In a further method, confidential documents which bear confidential image information thereon are made of thin metallic sheets with an extremely smooth surface. Since light is reflected almost uniformly from the entire smooth surface during the exposure process although the smooth surface bears image information, it is impossible to form the latent electrostatic images corresponding to the original images from the shiny original.

In these conventional methods, there is employed a technique of minimizing the difference in density between the image area and non-image area or of making the difference substantially zero when exposed during the image exposure process, thus making the confidential document look as if it is a blank original which bears no images thereon at the time of exposure. A significant shortcoming of these confidential documents is that they are difficult to read.

Conventional photoconductors for use in electrophotographic copying machines are designed so as to have photosensitivities which are as close as possible to the photosensitivity of the human eye, in order to make faithful copies from originals which bear images visible to the human eye. Under such circumstances, confidential documents which hardly allow legible copying by the conventional electrophotographic copying machine are suitable as confidential documents in order to prevent the copying thereof, but they are usually difficult to read and not suitable for normal reading, whereas documents which allow legible copying are easy to read, but not suitable as confidential documents which prevent the copying thereof.

SUMMARY OF THE INVENTION

It is therefore an object of the present invention to provide a confidential document reproduction prevention method by which confidential documents, which are legible as ordinary documents, are completely prevented from being reproduced.

This object of the present invention is attained by the steps of applying a particular material as a confidential mark at least to one portion of the surface of the confidential document, which particular material, when exposed to infrared radiation, is capable of emitting visible light; detecting the light emitted from the material by a detector in a reproduction machine when the document is exposed to light; and making the reproduction machine inoperative, upon detection of the light from the particular material.

DETAILED DESCRIPTION OF THE PREFERRED EMBODIMENTS

Figure 1:
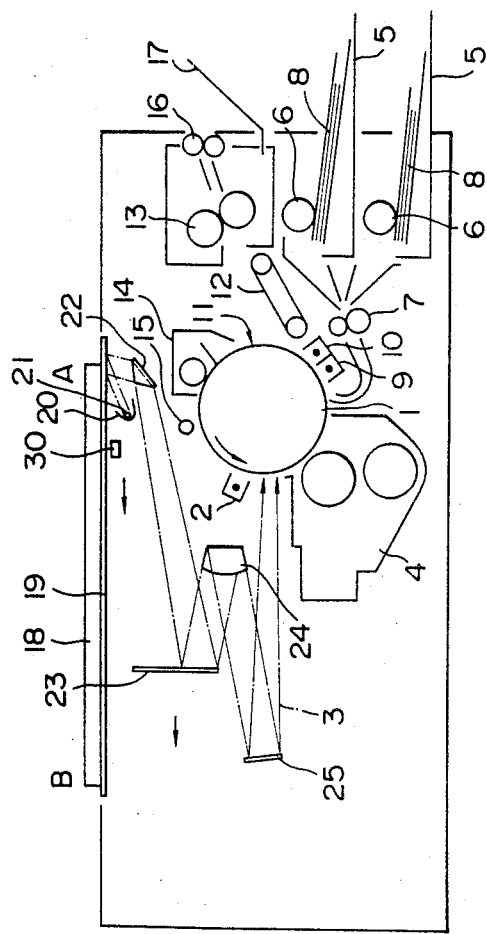
FIG. 1 is a schematic side view of an electrophotographic copying machine for use in the present invention.

Referring to FIG. 1 through FIG. 3, a first-type confidential mark detector according to the present invention for preventing reproduction of confidential documents will be explained, which confidential mark detector is built in an electrophotographic copying machine.

To begin with, referring to FIG. 1, the outline of the electrophotographic copying machine will now be explained.

Around a photoconductor drum 1, there are arranged a corona charger 2 for electrically charging uniformly the surface of the photoconductor drum 1; an exposure optical system 3 for projecting the optical image of an original image onto the uniformly charged surface of the photoconductor drum 1 to form a latent electrostatic image thereon, corresponding to the original image; a development apparatus 4 for developing the latent electrostatic image with a developer to a visible toner image; an image transfer charger 9 for transferring the developed toner image from the surface of the photoconductor drum 1 to a transfer sheet 8, the transfer sheet 8 being supplied from a sheet cassette 5 through a sheet feed roller 6 and registration rollers 7 and then brought into contact with the developed toner image on the surface of the photoconductor drum 1; a sheet separation charger 10 and a sheet pick-off pawl 11 for separating the transfer sheet 8 from the photoconductor drum 1; an image fixing apparatus 13 for fixing the developed toner image to the transfer sheet 8, which has been separated from the photoconductor drum 1 and then transported to the image fixing apparatus 13 by a sheet transportation belt 12; a cleaning apparatus 14 for cleaning the surface of the photoconductor drum 1 after image transfer; and a charge quenching lamp 15 for quenching electric charges remaining on the surface of the photoconductor drum 1. Outside the image fixing apparatus 13, there are provided sheet discharge rollers 16 and a sheet discharge tray 17.

In the upper portion of the copying machine, there is disposed a contact glass 19 on which an original document to be copied is placed. The contact glass 19 and the original document are covered by a pressure plate 18 during exposure.

The exposure optical system 3 comprises an exposure lamp 21 which is partially surrounded by a reflector 20; a first mirror 22; a second mirror 23; an in-mirror lens 24 and a fourth mirror 25. The exposure lamp 21 and the first mirror 22 are moved integrally parallel to the contact glass 19 from the right to the left in FIG. 1, while illuminating the surface of the contact glass 19. The second mirror 23 is also moved in the same direction as that of the first mirror 22 at a speed of half of the speed of the first mirror 22.

Figure 2A:
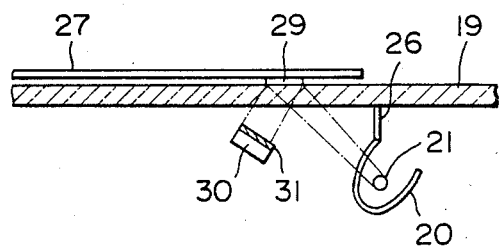
FIG. 2a is an enlarged side view of the main portion of a first-type confidential mark detector for use in the electrophotographic copying machine shown in FIG. 1.

The exposure lamp 21 is a light source which emits illumination light which contains a light component for forming latent electrostatic images on the photoconductor drum 1 and a light component for exciting a particular material contained in a confidential mark attached to the original document, which particular material will be explained later in detail. As shown in FIG. 2a, the reflector 20, made of a cold mirror which selectively allows particular light components to pass therethrough, is disposed in such a manner that the particular light components which pass through the reflector 20 are directed upwards slantingly with respect to the scanning direction of the original document placed on the contact glass 19. Further, there is disposed a light shielding plate 26 between the contact glass 19 and the reflector 20.

Figure 3A:
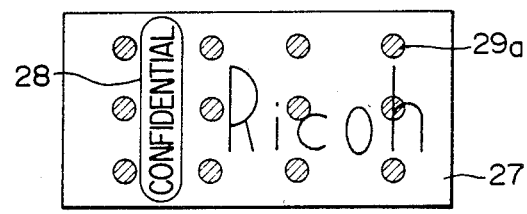
FIG. 3a is a schematic illustration of example of a confidential document with a specific arrangement of confidential marks.
Figure 3B:
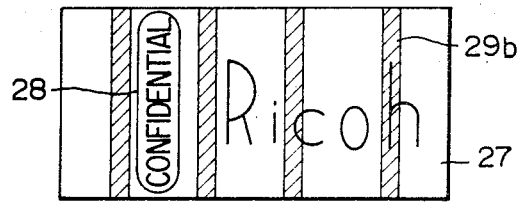
FIG. 3b is a view like FIG. 3a and showing a first modified arrangement of confidential marks.
Figure 3C:
FIG. 3c is a view like FIG. 3a and showing a second modified arrangement of confidential marks.

As shown in FIGS. 3a–3c, a confidential document 27 employed in the present invention bears confidential image information 28. The confidential image information 28 is legible as in the case of ordinary documents. As shown in FIG. 3(a), a confidential document bears spot-shaped confidential marks 29a made of a material, which, when exposed to a particular excitement light component and excited, emits emission light with a wavelength which is different from the wavelength of the excitement light component, as shown in FIG. 3(b) a confidential document bears stripe-shaped confidential marks 29b made of the same material 29, and as shown in FIG. 3(c), a confidential document bears an overall coating 29c of the same material 29. With respect to the positioning of the confidential marks, many other variations can be made. An essential requirement for the confidential documents for use in the present invention is that the confidential documents bear at least one confidential mark within the document.

As the above-mentioned particular materials 29, the following conventional fluorescent materials can be employed:

(1) Inorganic fluorescent pigments comprising as the main component oxides, sulfides, silicates, phosphates, tungstates of Ca, Ba, Mg, Cd or the like, with addition thereto of an active agent, such as Mn, Ag, Cu, Sb or Pb in an amount ranging from 1.0 mole % to 0.01 mole %, more specifically inorganic fluorescent pigments comprising as the main component potassium chloride, sodium iodide, zinc sulfide, zinc oxide or cadmium sulfide, with addition of above-mentioned active agents.

(2) Organic fluorescent dyes capable of emitting strong fluorescence, such as stilbene dyes, acylaminoureide dyes, triazole dyes, imidazole dyes and pyrazoline dyes.

The above-described fluorescent materials emit visible light when exposed to ultraviolet light. Thus, ultraviolet light serves as the exciting light for excitement of the above fluorescent materials.

White sheets which are in general use as original document sheets contain some fluorescent materials for whitening the sheets. In order to prevent the malfunction of a detector for detecting a confidential mark containing the previously described particular material 29, which may be caused by the fluorescent materials contained in the white sheets, infrared light emitted from a halogen lamp is employed for excitement of the particular material 29, and, as the particular material 29, those which emit visible light when exposed to infrared light are preferably employed in the present invention.

Specifically, in the electrophotographic copying machine for use in the present invention, as shown in FIG. 1, infrared light separated from the light emitted from the exposure lamp 21 is employed as the excitement light for the material 29. The separation of infrared light can be done by the reflector 20 made of cold mirror.

As the materials 29, materials which emit visible light when exposed to infrared light, for example, the following materials, can be employed:

Materials comprising any of the following matrix crystals doped with a rare earth element which serves as an impurity of the matrix crystals: $YF_3$, $LaF_3$, $GdF_3$, $LuF_3$, $BaYF_5$, $BaLuF_5$, $BaY_2F_3$, $BaF_2$, $LiYF_4$, $Y_2O_2S$, $La_2O_2S$, $LaGaO_3$, $Gd_2O_2S$, $Y_2O_3$, $Gd_2O_3$, $Y_3OCl_7$, $YOCl$, $YbOCl, YCl_3$, $YbNa(WO_4)_2$, $LaGaO_3$ and $YbOCl-MRX_4$, wherein M represents an alkaline metal, X represents halogen, and R represents Y, La, Gd or Lu.

As the rare earth elements for the above doping, combinations of Ce or Yb, and at least one selected from the group consisting of Er, Ho and Tm, are preferable.

As the fluorescent materials for confidential marking colorless or light-colored materials are preferable, in order to make the confidential marks on the document invisible as much as possible, or in order that the fluorescent material not hinder reading of the image information on the document.

Those fluorescent materials are described in detail in a reference book entitled "Kyoritsu Chemistry Libraries 10—Fluorescence Phenomena" by Shoji Makijima et al, published by Kyoritsu Shuppan Co., Ltd. in Japan.

As the fluorescent materials 29, materials having stimulation effect can also be employed, which materials emit bright light when pre-excited by absorption of a particular light component and then exposed to another light component with a comparatively long wavelength light, for example, infrared light.

Examples of such materials having stimulation effect are sulfides, oxides of CaS:Bi, ZnS:Cu and ZnS:CuCo, barium fluorochloride, barium fluorobromide and barium fluoroiodide.

Referring to FIG. 2a, there is shown an enlarged side view of a first-type confidential mark detector. In this confidential mark detector, the particular material 29 coated on the confidential document 27 emits visible light when illuminated by infrared light which comes from the exposure lamp 21 through the reflector 20. As a means for detecting the visible light emitted from the material 29, a photosensor 30 is employed. The photosensor 30 is constructed so as to move integrally with the exposure lamp 21 and the first mirror 22. As a photosensor element of the photosensor 30, a CdS photocell, a photoelectric tube, a Si photodiode and a Ge detector element can be employed. Since the CdS photocell and the photoelectric tube can detect only visible light, they can be used without any filter. However, in the case of the Si photodiode and the Ge detector element which detect both visible light and infrared light, it is necessary to attach an infrared-cut filter 31 to the Si photodiode and the Ge detector element in order to prevent malfunction of those sensors.

As the infrared-cut filter 31, a filter comprising a base glass with multiple layers evaporated thereon, which allows only visible light to pass therethrough and reflects infrared light therefrom, or a filter comprising a base glass containing therein metallic ions which absorb infrared light, can be employed.

Referring again to FIG. 2a, before starting copying, an original document 27 to be copied is placed on the contact glass 19. Before performing exposure-scanning of the original document 27, the original document 27 is first illuminated with infrared light which is emitted from the exposure lamp 21 through the reflector 20. When the original document 27 is a confidential document with a confidential mark containing the above-described material 29, the confidential mark emits, for example, visible light when exposed to the infrared light from the exposure lamp 21. The visible light is detected by the photosensor 30. That detection indicates that the original to be copied is a confidential document that must not be copied. By a detection signal generated from the photosensor 30, the copying operations including the initial electric charging of the photoconductor 1 and the subsequent energizing of the exposure optical system 3 are all stopped. As a result, it becomes impossible to make a copy from that original document. In the case where an original document to be copied does not bear a confidential mark containing the material 29, even if the original document is exposed to infrared light from the exposure lamp 21, no visible light is emitted from the original document, so that copying of the original document can be performed normally.

In the above-described method, the confidential mark detector is designed in such a manner that the photosensor 30 detects the confidential mark before the initial charging of the photoconductor 1 begins. Therefore, when a confidential mark is detected, copying of the original document cannot be carried out from the beginning.

The present invention is not limited to the above-described method.

Depending upon the location of the confidential mark on the confidential original document, the following method can also be employed, in which, the original document is exposed to scanning light for formation of the latent electrostatic images corresponding to the original images of the original document, and, in the meantime, the original document is exposed to infrared illumination for detection of a confidential mark. In this method, if a confidential mark containing the material 29 is detected by the photosensor 30 during the scanning exposure for the formation of the latent electrostatic images on the photoconductor 1, the copying process has already been initiated. Therefore, it is necessary to cancel or stop at least one of the essential copying processes, upon detecting the confidential mark, for instance, by subjecting the photoconductor drum 1 to overall exposure for elimination of all the latent electrostatic images formed thereon by that time, or by stopping feeding of a developer or transfer sheets towards the photoconductor drum 1, in order to make the copying of the original document impossible.

The basic principle of the above-described methods is that, upon generation of a detection signal indicating the presence of the confidential mark by the photosensor 30, the subsequent copying operations are stopped or cancelled. In the case of an electrophotographic copying machine as shown in FIG. 1, for better maintenance of the copying machine, it is preferable to make the copying impossible by stopping supplying of the developer, or by changing the voltage applied to the image transfer charger 9, without immediately stopping the rotation of the photoconductor drum 1. In this specification, the term "the copying operations" means all the steps essential for making normal copies, and the phrase "the copying operations are stopped or cancelled" means setting the copying machine in a state in which no copies can be made or no normal copies can be made.

In the present invention, confidential documents with confidential marks are the same as ordinary documents in terms of legibility, and the confidential marks attached to the confidential documents are almost invisible. When a confidential mark, which is hardly noticed by the operator of the copying machine, is detected by the photosensor 30, at least one part of the copying operations in the copying machine is stopped, and copying operation is made impossible without the reason for such stopping of the copying machine being noticed by the operator.

Figure 2B:
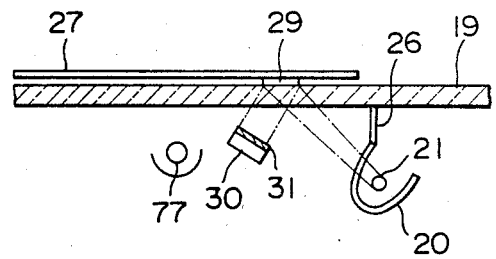
FIG. 2b is an enlarged side view of the main portion of a modified first-type confidential mark detector for use in the electrophotographic copying machine shown in FIG. 1.

In the case where, as the material 29, a fluorescent material having stimulation effect is employed, it is necessary to pre-excite the fluorescent material before the fluorescent material is illuminated by long-wavelength light, for instance, by infrared light. For instance, when a confidential document with a confidential mark containing the above-mentioned fluorescent material with stimulation effect is exposed to daylight, the fluorescent material is in an excited state, and therefore, it will be unnecessary to excite the fluorescent material by exposing the fluorescent material to light. However, for more secure excitement of the fluorescent material, a modified first-type confidential mark detector as shown in FIG. 2b is useful, in which an excitement light source 77 is additionally employed, which excitement light source 77 emits ultraviolet light or other short-wavelength light for exciting the fluorescent material before the fluorescent material 29 is exposed to infrared light. As the excitement light source 77, a black light lamp which emits ultraviolet light, a fluorescent lamp which emits light with a wavelength suitable for the above-mentioned excitement, and a tungsten lamp with a comparatively high color temperature, can be employed.

Fluorescent materials with stimulation effect are generally less expensive and more easily available than other fluorescent materials. Further, since the fluorescent materials with stimulation effect emit phosphorescence with higher energy when exposed to infrared light than other fluorescent materials do, higher accuracy for detection is attained and a detection device using such a fluorescent material with stimulation effect can be made with a simpler structure in comparison with a detection device using other fluorescent materials.

In the above, instead of the exposure lamp 21 which, for example, emits visible light and infrared light, a tungsten lamp can also be employed.

Figure 4:
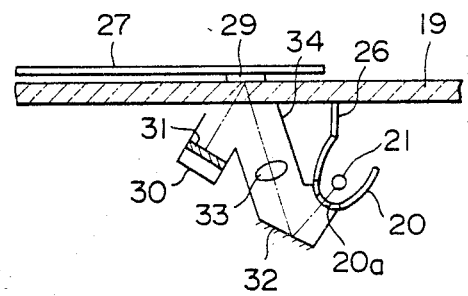
FIG. 4 is an enlarged side view of the main portion of another modified first-type confidential mark detector for use in the electrophotographic copying machine shown in FIG. 1.
Figure 5:
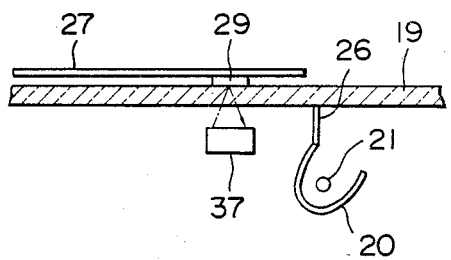
FIG. 5 is an enlarged side view of the main portion of a second-type confidential mark detector for use in the electrophotographic copying machine shown in FIG. 1.
Figure 6:
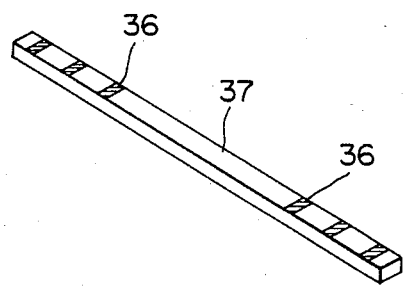
FIG. 6 is a perspective view of a detection array of the second-type confidential mark detector shown in FIG. 5.
Figure 7:
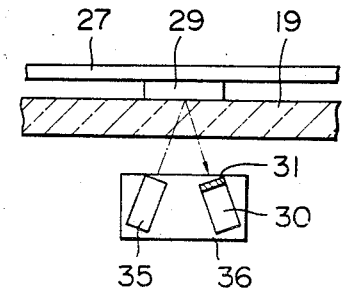
FIG. 7 is a schematic illustration in explanation of the operation of the second-type confidential mark detector shown in FIG. 5.
Figure 8:
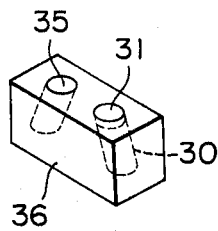
FIG. 8 is a perspective view of a detecting portion of the second-type confidential mark detector shown in FIG. 5.

Referring to FIG. 4, there is shown an enlarged side view of the main portion of another modified first-type confidential mark detector for use in the electrophotographic copying machine as shown in FIG. 1. In this modified confidential mark detector, part of the reflector 20 is made of a cold mirror section 20a. The material 29 attached to the original document 27 is illuminated and excited with infrared light which is obtained from the exposure lamp 21 through the cold mirror section 20a, a mirror 32 and a lens 33. Reference numeral 34 represents a light shielding plate.

Referring back to FIG. 1, a reference symbol A represents a home position of the first mirror 22. A confidential mark is detected during the detection scanning of the original document by the first-type confidential mark detector from the home position A of the first mirror 22 to an opposite end position with a reference symbol B. This detection method can be modified in such a manner that the confidential mark detection scanning is performed from the position B to the position A, and when no confidential marks are detected, exposure scanning for latent electrostatic image formation is performed from the position A to the position B.

Referring to FIG. 5 through FIG. 8, a second type confidential mark detector for use in the present invention will now be explained. In this confidential mark detector, there is employed a detection array 37 extending in the direction normal to the detection scanning direction, which detection array 37 comprises a plurality of detectors 36. Each detector 36 comprises an independent light source 35 and a photosensor 30 for sensing infrared light which is emitted from the material 29 attached to a confidential document when the material 29 is illuminated by the light source 35.

As the light source 35, for instance, a light emitting diode for emitting infrared light can be employed. As the light source 35, a tungsten lamp can also employed if it is used in combination with a visible-light-cut filter.

Figure 9:
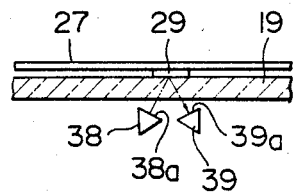
FIG. 9 is an enlarged side view of the main portion of a third-type confidential mark detector for use in the electrophotographic copying machine shown in FIG. 1.
Figure 10:
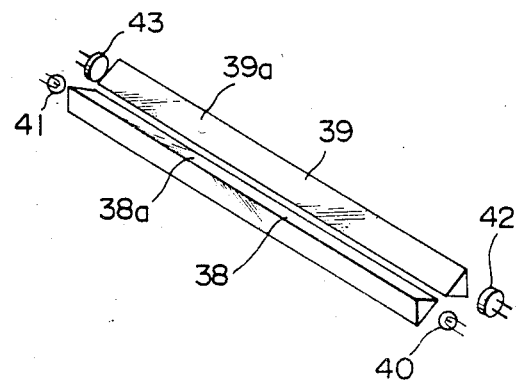
FIG. 10 is a perspective view of light-transmittance members, light-sources and photosensors of the third-type confidential mark detector shown in FIG. 9.
Figure 11:
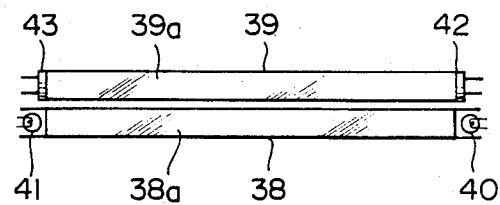
FIG. 11 is a plan view of the main portion of the third-type confidential mark detector shown in FIG. 9.

Referring to FIG. 9 through FIG. 11, a third type confidential mark detector for use in the present invention will now be explained. In this confidential mark detector, a pair of light-transmittance members 38 and 39 are employed, which are made of polished glass or a transparent plastic material (for example, polymethyl methacrylate (PMMA) or polycarbonate). From a pair of light sources 40 and 41 disposed at the opposite ends of the light-transmittance member 38, infrared light is caused to enter the light-transmittance member 38 so as to emit the infrared light from an irradiation surface 38a of the light-transmittance member 38, illuminating with the infrared light the surface of the original document 27 placed on the contact glass 19. When the original document 27 bears a confidential mark containing the material 29 and the mark is illuminated with infrared light, visible light, for example, is emitted from the confidential mark and is received by a light-incidence surface 39a of the light-transmittance member 39. The visible light is transmitted through the light-transmittance member 39 to a pair of photosensors 42 and 43 located at the opposite ends of the light-transmittance member 39. In this case, if the photosensors 42 and 43 are sensitive to infrared light, it is necessary to attach infrared-cut filters thereto in order to prevent the malfunction of the photosensors 42 and 43.

Figure 12:
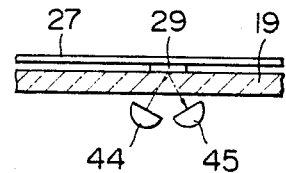
FIG. 12 is an enlarged side view of the main portion of a modified third-type confidential mark detector for use in the electrophotographic copying machine shown in FIG. 1.

Further, in the case of the light-transmittance members 38 and 39, when the surfaces of the light-transmittance members 38 and 39 other than the irradiation surface 38a and the light-incidence surface 39a are coated with a thin film of Al or Ag by vacuum evaporation or by sputtering, the reflection efficiency of the light-transmittance members 38 and 39 can be increased, and, accordingly, the detection accuracy of the confidential mark detector can also be significantly increased. Although the light-transmittance members 38 and 39 shown in FIG. 9 through FIG. 11 are triangular in the cross section, they are not limited to such shape. They can be formed in the shape of the letter D in the cross section as shown by reference numerals 44 and 45 in FIG. 12. The irradiation surface 38a of the light-transmittance member 38 can also be made so as to have light scattering properties, for example, like those in the surface of ground glass.

Figure 13:
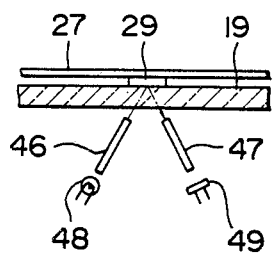
FIG. 13 is an enlarged side view of the main portion of a fourth-type confidential mark detector for use in the electrophotographic copying machine shown in FIG. 1.
Figure 14:
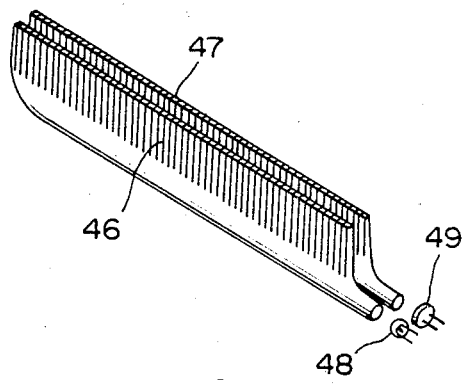
FIG. 14 is a perspective view of the main portion of the fourth-type confidential mark detector shown in FIG. 13.

Referring to FIG. 13 and FIG. 14, a fourth type confidential mark detector for use in the present invention will now be explained. In this confidential mark detector, optical fiber arrays 46 and 47 are employed as light-transmission elements. Those optical fiber arrays are made of a number of optical fibers made of glass or a transparent plastic material, which are fastened in the form of parallel straight narrow arrays with substantially the same length as the width of an original document, extending in the direction normal to the exposure scanning direction as shown in FIG. 14. For example, infrared light is caused to enter the optical fiber array 46 from a light source 48 through one end portion of the optical fiber array 46. The infrared light emitted from the upper edge portion of the optical fiber array 46 is projected across the surface of the original document in the width direction thereof. If the material 29 is illuminated with the infrared light, for example, visible light is emitted from the material 29 and is then received by the upper end portion of the optical fiber array 47, through which the visible light is transmitted to a photosensor 49 disposed near the other end portion of the optical fiber array 47.

Figure 15:
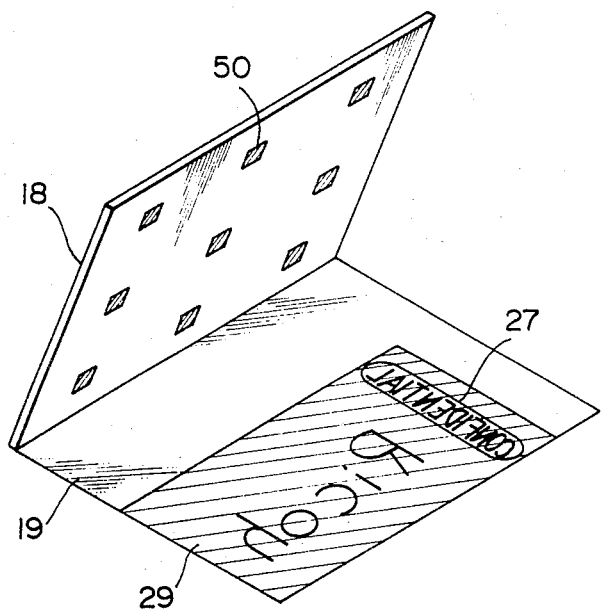
FIG. 15 is a perspective view of the main portion of a fifth-type confidential mark detector for use in the electrophotographic copying machine shown in FIG. 1.

Referring to FIG. 15, a fifth-type confidential mark detector for use in the present invention will now be explained. In this confidential mark detector, detectors 50 for detecting the material 29 are located on the pressure plate 18, and the material 29 is coated all over the back side of the confidential document 27 or in the form of spots on the back side of the confidential document 27. As the detectors 50, the detectors 36 employed in the previously described second type confidential mark detector can be employed. In this confidential mark detector, the smaller the opening area of the light projecting and light receiving portions of the detector, the better, in order to minimize the opening portions' adverse effects on the images to be copied when the confidential marks are detected light projection and light receiving.

It is preferable that the material 29 be coated all over the back side of the confidential document 27. Alternatively, the material 29 can be coated in the form of spots at positions corresponding to the positions of the detectors 50 in the pressure plate 18.

Figure 16:
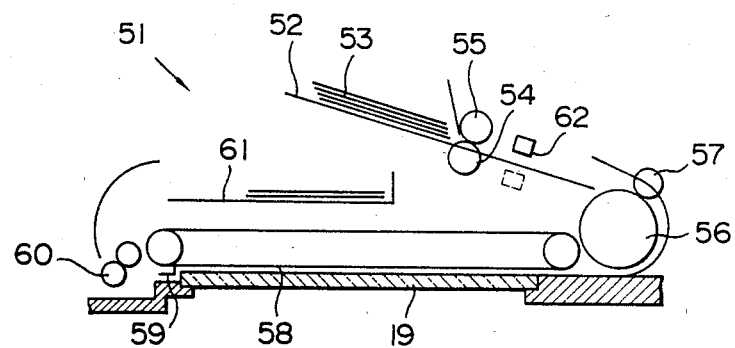
FIG. 16 is a partial schematic side view of a copying machine with an auto document feeder, in which a sixth-type confidential mark detector for use in the present invention is employed.

Referring to FIG. 16, a sixth type confidential mark detector for use in the present invention will now be explained. This confidential mark detector is employed in a copying machine provided with an auto document feeder 51. In the auto document feeder 51, original documents are stacked on an original tray 52 and are individually transported onto the contact glass 19 by a sheet feed roller 54, a sheet separation roller 55, a turn roller 56 and a pinch roller 57, and a sheet transfer belt 58. When each original document is transported onto the contact glass 19, the original document is stopped by a stopper pawl 59 and set at a predetermined position. After exposure of the original document for latent electrostatic image formation, the stopper pawl 59 is retracted from the original document transportation path, and the the original document is discharged onto a sheet tray 61 by the transportation belt 58 and transportation rollers 60.

A detector 62 for detecting the presence of a confidential mark containing the material 29 on an original document 53 is located between the sheet feed roller 54 and the turn roller 56 in such a manner that the detector 62 is directed towards the front surface (i.e., image-information-bearing side) of the original document 53. The detector 62 is equivalent to the previously described detector 36. When an original document with a confidential mark containing the material 29 passes under the detector 62 and the confidential mark is detected by the detector 62, the copying machine is automatically made inoperative. In the case of this confidential mark detector, since the confidential mark, if any, is detected before the original document 53 is transported onto the contact glass 19, all the copying operations for copying the original document can be completely stopped before a copy is made. Further, in this case, the material 29 can be coated on the back side of a confidential original document when the detector 62 is located under the original document at a position shown by the broken lines in FIG. 16.

Figure 17:
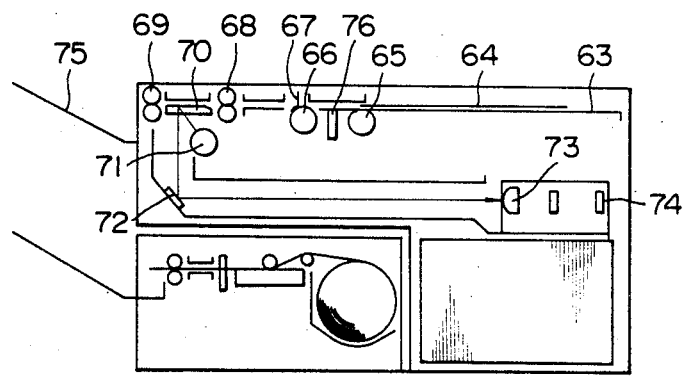
FIG. 17 is a schematic side view of a facsimile apparatus in which a seventh-type confidential mark detector for use in the present invention is employed.

Referring to FIG. 17, a seventh type confidential mark detector for use in the present invention will now be explained. This confidential mark detector is employed in a facsimile apparatus. Original documents 64 stacked on an original table 63 are individually fed into the facsimile apparatus by an original document transportation roller 65, an original sheet separation roller 66 and an original sheet separation plate 67. The original document 64 is caused to pass over a contact glass 70 with a predetermined speed by a front image-information-reading transportation roller 68 and a back image-information-reading transportation roller 69, while illuminated with light emitted from a light source 71. Light reflected from the original document 64 is received by an image sensor 74 through a mirror 72 and a lens system 73. Image signals generated from the image sensor 74 are transmitted to an image receiving side for recording the transmitted image information. Reference numeral 75 represents a tray for stacking original documents thereon after facsimile transmission.

A detector 76 for detecting the presence of a confidential mark containing the material 29 is disposed between the original document transportation roller 65 and the original sheet separation roller 66, with a detection side thereof directed towards the image-information-bearing side of the original document 64.

As the detector 76, the optical fiber detector employed in the fourth confidential mark detector is preferable for use. When the detector 76 detects the presence of the material 29 on an original document 63, illumination of the original document by the light source 71, which is one of the necessary operation steps for facsimile transmission, is discontinued, and no image information is detected by the image sensor 74. As a result, no image information is received by the reception side of the facsimile system. It can be designed in such a manner that, when the presence of the material 29 is detected, feeding of original sheets towards the front and back image-information-reading transportion rollers 68 and 69 can be stopped, instead of turning off the light source 71.

The above-described confidential mark detectors for use in the present invention and the confidential document reproduction prevention method according to the present invention can be applied not only to electrophotographic copying machines of the above-described type, but also to a diazo copying machines and an electrophotographic copying machine of the type having a movable contact glass. Further, as the excitement light for exciting the material 29, ultraviolet light can also be employed.

What is claimed is:

1. A confidential document reproduction prevention method for use in a reproduction machine, comprising the steps of:
    attaching a fluorescent material to at least one portion of an original confidential document, said fluorescent material, when exposed to infrared radiation, being capable of emitting visible light, said fluorescent material being selected from the group consisting of $YF_3$, $LaF_3$, $GdF_3$, $LuF_3$, $BaYF_5$, $BaLuF_5$, $BaY_2F_3$, $BaF_2$, $LiYF_4$, $Y_2O_2S$, $La_2O_2S$, $LaGaO_3$, $Gd_2O_2S$, $Y_2O_3$, $Gd_2O_3$, $Y_3OCl_7$, $YOCl$, $YbOCl$, $YCl_3$, $YbNa(WO_4)_2$, $LaGaO_3$ and $YbOCl\cdot MRX_4$, wherein M represents an alkaline metal, X represents halogen, and R represents Y, La, Gd or Lu, said fluorescent material being doped with a combination of rare earth elements wherein said combination of rare earth elements is a combination of Ce or Yb, and at least one element selected from the group consisting of Er, Ho and Tm;
    in said reproduction machine, exposing said original document which bears said fluorescent material to infrared radiation so that visible light is emitted by said fluorescent material;
    detecting said emitted visible light by a detector element which is capable of generating a detection signal upon detecting said emitted visible light; and
    stopping or cancelling at least one of the steps indispensable for reproduction of said original document in said reproduction machine in response to said detection signal from said detector element.

2. A confidential document reproduction prevention method as claimed in claim 1, wherein said fluorescent material is colorless or light-colored.

3. A confidential document reproduction prevention method as claimed in claim 1, wherein the exposing of said orginal document to said infrared radiation and the detection of said emitted light are performed by a confidential mark detector comprising a light source capable of emitting said infrared radiation towards the said-material-bearing side of said original document, and said detector element.

4. A confidential document reproduction prevention method as claimed in claim 3, wherein said light source is provided with a filter which allows only infrared radiation components to pass therethrough.

5. A confidential document reproduction prevention method claimed in claim 3, wherein said detector element is provided with a cut-filter for allowing only said emitted visible light to pass therethrough.

6. A confidential document reproduction prevention method as claimed in claim 1, wherein said fluorescent material has a stimulation effect, and the exposing of said original document to said infrared radiation and the detection of said emitted visible light are performed by a confidential mark detector comprising (a) a pre-excitement light source for pre-exciting said fluorescent material, (b) an infrared radiation source capable of emitting infrared radiation towards the said-material-bearing side of said original document so as to cause the pre-excited fluorescent material to emit said visible light, and (c) said detector element.

7. A confidential document reproduction prevention method as claimed in claim 3, wherein said confidential mark detector further comprises a pair of light-transmitting members, said infrared radiation being transmitted through one of said light-transmitting members, and said emitted visible light being transmitted through the other light-transmitting member.

8. A confidential document reproduction prevention method as claimed in claim 7, wherein said light-transmitting members are made of a transparent material.

9. A confidential document reproduction prevention method as claimed in claim 7, wherein said light-transmitting members are made of optical fibers.

* * * * *